Patented Feb. 26, 1935

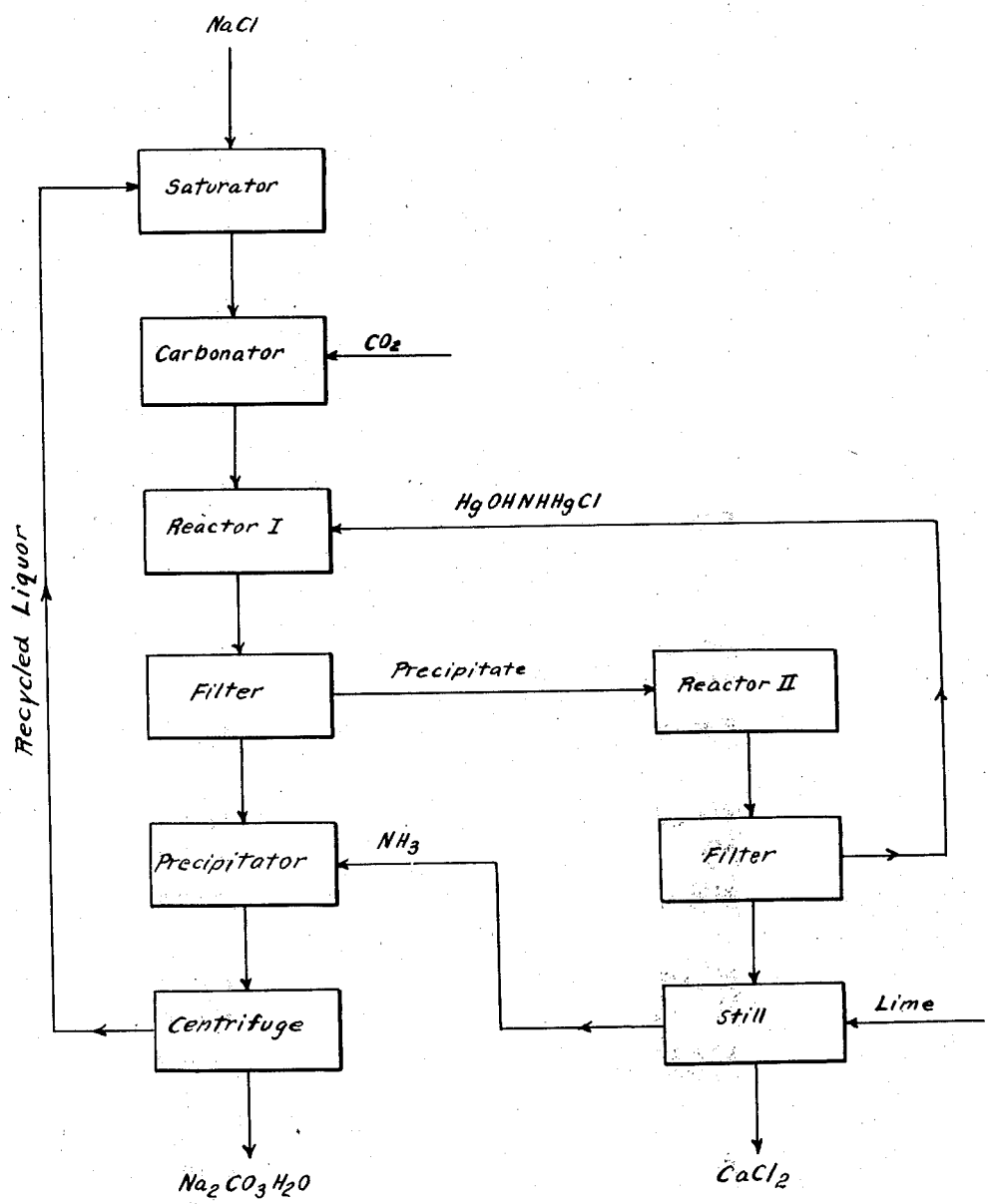

1,992,318

UNITED STATES PATENT OFFICE 1,992,318

PROCESS FOR THE MANUFACTURE OF ALKALI METAL CARBONATES AND HYDROXIDES AND RECOVERY OF AMMONIUM CHLORIDE

Robert B. MacMullin, Niagara Falls, N. Y., assignor to The Mathieson Alkali Works, Inc., New York, N. Y., a corporation of Virginia Application July 26, 1932, Serial No. 624,701

16 Claims. (Cl. 23—63)

This invention relates to improvements in the manufacture of the carbonates and the hydroxides of the alkali metals. More particularly, the invention relates to improvements in the manufacture of sodium carbonates and sodium hydroxide, but the invention is also useful in the manufacture of the carbonates and hydroxides of the other alkali metals.

In the conventional ammonia-soda process, an aqueous solution of sodium chloride is treated with ammonia and carbon dioxide to produce sodium bicarbonate and ammonium chloride, the sodium bicarbonate crystallizing from the solution containing the ammonium chloride. Processes have also been proposed in which ammonium chloride is separated by crystallization as such from a solution produced by treatment of an aqueous solution of sodium chloride with ammonia and carbon dioxide.

This invention includes a novel method of separating ammonium chloride as an addition product from aqueous solutions of alkali metal chlorides, a general process for the production of aqueous solutions of alkali metal carbonates embodying this novel separation, specific methods for the production of specific carbonates and hydroxides of alkali metals, a method for the regeneration of the precipitant used in the method of separation of the invention, and cyclic operations embodying the invention.

I have discovered that ammonium chloride can be precipitated from aqueous solutions of sodium chloride, for example, with mercuric hydroxyl chloramide, HgOH.NH.HgCl, in the form of an addition product. The addition product appears to be in the nature of a mercuric amido chloride, but the separation of the addition product from the solution seems to involve the separation of some free ammonia so that I cannot precisely identify the constitution of the addition product. This addition product, however, is very insoluble, at low and at moderate temperatures, and is readily separated from the solution. I have also discovered that this precipitation can be carried out in the presence of ammonia and carbon dioxide. This novel separation of ammonium chloride as an addition product may thus be combined with operations for the production of sodium carbonates and sodium hydroxide, for example.

In the production of aqueous solutions of alkali metal carbonates, in accordance with this invention, ammonium chloride is precipitated from an aqueous solution of the alkali metal chloride as an addition product with mercuric hydroxyl chloramide in the presence of ammonia and carbon dioxide. The precipitated addition compound, including the ammonium chloride, is separated from the aqueous solution of alkali metal carbonate thus produced, decomposed to regenerate the mercuric hydroxyl chloramide and to recover the ammonium chloride, and the regenerated mercuric hydroxyl chloramide is re-used in the operation. The reactions involved in the production of aqueous solutions of sodium carbonate, in this manner, may be summarized as follows:

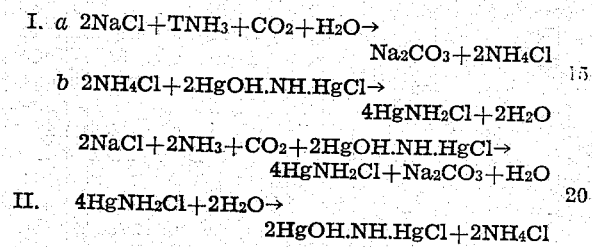

I do not mean to say that the reactions involved are necessarily as simple as the foregoing would indicate, and I also have noted that I cannot precisely identify the constitution of the addition product but the foregoing represent the general nature of the reactions involved in the operation. The operation corresponding to the first reaction is carried out at low or moderate temperatures, advantageously in the range 15°–40° C. The operation corresponding to the second reaction is carried out at elevated temperature, at a temperature approximating 100° C. for example. It is possible, in this manner, to separate, as ammonium chloride, as much as 75–80% or more of the total chloride content of the solution.

The character of the sodium carbonate solution, for example, resulting after separation of the precipitated ammonium chloride addition product, in the presence of ammonia and carbon dioxide, varies with and can be controlled by controlling the ratio of carbon dioxide to ammonia. In general, the molecular ratio $CO_2:NH_3$ is with advantage kept at a value ranging from about 0.2 to 1.0. When the molecular ratio $CO_2:NH_3$ is close to 1.0, upwards, of about 0.6, a solution of sodium bicarbonate is produced and sodium bicarbonate will be precipitated if the solution is sufficiently concentrated. Similarly, when the molecular ratio $CO_2:NH_3$ approximates 0.4–0.6, a solution of sodium sesquicarbonate is produced and sodium sesquicarbonate will be precipitated if the solution is sufficiently concentrated. Again, when the molecular ratio $CO_2:NH_3$ is less than about 0.5, upwards of about 0.2, the solution includes sodium hydroxide as well as sodium carbonate. The reactions involved in the formation of sodium hydroxide, and which occur simultaneously with those involving the formation of sodium carbonate, are as follows:

III. *a* $NaCl + NH_4OH \rightarrow NaOH + NH_4Cl$

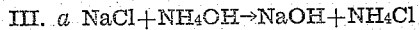

*b* $NH_4Cl + HgOH.NH.HgCl \rightarrow 2HgNH_2Cl + H_2O$

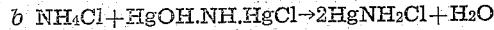

The solution is maintained sufficiently dilute, during precipitation and separation of the ammonium chloride addition product, to prevent precipitation of any of the sodium carbonates. After separation of the ammonium chloride addition product, several sodium carbonates may be recovered by concentration of the solution. The molecular ratio $NH_3:NaCl$ is with advantage kept within limits approximating 0.33–3.0, best at a value approximating about 1.0.

The reaction involved in the formation of the ammonium chloride addition product proceeds in both dilute and concentrated solutions. The invention is useful, for example, in connection with the separation of ammonium chloride from aqueous solutions of sodium chloride, ranging in concentration up to saturation with respect to sodium chloride. In the production of aqueous solutions of sodium carbonates, in accordance with the invention, the use of sodium chloride solutions containing less than about 12% NaCl involves the handling of large volumes of solutions. The use of sodium chloride solutions containing more than 20% NaCl involves the handling of heavy slurries, because of the bulk of the ammonium chloride addition product. The use of sodium chloride solutions containing about 15–20% NaCl is particularly advantageous. In operations in which a sodium carbonate is precipitated from the solution following precipitation and separation of the ammonium chloride addition product, the mother liquor remaining after separation of the precipitated sodium carbonate may be re-used, cyclically, in the operation. For example, sodium chloride may be added to this mother liquor, ammonium chloride precipitated therefrom in the presence of ammonia and carbon dioxide by the addition of mercuric hydroxyl chloramide, and so on.

Sodium carbonate monohydrate, $Na_2CO_3.H_2O$, is produced in a particularly advantageous manner by precipitating the ammonium chloride addition product from an aqueous solution of sodium chloride in the presence of ammonia and carbon dioxide while maintaining the molecular ratio $CO_2:NH_3$ at a value approximating 0.2–0.5 and, after separating the precipitated addition product, precipitating sodium carbonate monohydrate from the solution by the addition of ammonia in proportion less than that precipitating sodium carbamate. Such recovery of sodium carbonate monohydrate from the aqueous solution of sodium carbonate so produced may be carried out as described in an application filed March 25, 1932, Serial Number 601,144, by me.

The aqueous solutions of sodium carbonates produced in accordance with the invention, after separation of the precipitated ammonium chloride addition product, normally contain some sodium chloride as such. These solutions may nevertheless be causticized, with calcium oxide or calcium hydroxide for example, to produce solutions of sodium hydroxide. The sodium chloride content of the sodium hydroxide solutions so produced may be separated therefrom in the conventional manner during concentration of the sodium hydroxide solution.

The precipitant, mercuric hydroxyl chloramide, is conveniently prepared by treating an aqueous solution of mercuric chloride, at a temperature of 15°–20° C., with the theoretical amount of ammonia to produce mercuric amido chloride, $HgNH_2Cl$. The mercuric amido chloride precipitates from the solution and is separated, for example, by filtration or decantation. This mercuric amido chloride is then treated with boiling water for a few minutes to produce an aqueous solution of ammonium chloride from which the precipitant, mercuric hydroxyl chloramide, is precipitated. The precipitated mercuric hydroxyl chloramide is separated from the ammonium chloride solution at elevated temperature. Mercuric hydroxyl chloramide is conveniently regenerated from the ammonium chloride addition product in the same manner. The presence of a free base, calcium oxide or calcium hydroxide for example, although not essential, tends to promote the regeneration, or the formation, of mercuric hydroxyl chloramide from the mercuric amido chloride. A corresponding proportion of ammonia is thus produced from the ammonium chloride initially produced in the reaction, and sufficient calcium oxide or hydroxide, or other appropriate base displacing ammonia, may be so used to convert all of the ammonium chloride produced to ammonia and calcium chloride, or other base chloride. The mercuric hydroxyl chloramide can also be regenerated at low temperatures, 15°–30° C., as well as higher temperatures by treatment with an appropriate base, calcium oxide or hydroxide or sodium hydroxide, in proportion corresponding to the ammonium chloride content of the addition product.

The invention will be illustrated by the following specific example of an operation for the production of sodium carbonate monohydrate embodying the invention:

1. 304 parts (by weight) of a carbonated ammoniacal sodium chloride brine containing 58.5 parts of sodium chloride, 17 parts of ammonia, 13 parts of carbon dioxide and 216 parts of water are treated with 350 parts of mercuric hydroxyl chloramide, the mixture being agitated for a period of about 30 minutes at a temperature of 20°–30° C. The ammonium chloride addition product thus precipitated is separated from the liquor, by filtration for example. The separated ammonium chloride addition product is treated with about 4 times its weight of water for about 30 minutes at a temperature of about 100° C. The mercuric hydroxyl chloramide is thus regenerated and is separated, at elevated temperature, from the resulting solution of ammonium chloride. The regenerated mercuric hydroxyl chloramide is re-used in the next cycle of the operation. The ammonia content of the ammonium chloride solution is recovered by treatment with lime at elevated temperature in the conventional manner. Sodium carbonate monohydrate is precipitated from the liquor from which the ammonium chloride addition product has been separated by the addition of from 34–68 parts of ammonia. The precipitated sodium carbonate monohydrate is separated from the mother liquor, by centrifuging for example. After regeneration of the mother liquor by the addition of sodium chloride and carbon dioxide, the ammonium chloride addition product is precipitated from this solution by the addition of mercuric hydroxyl chloramide in the next cycle of the operation.

The operation of the foregoing example is further illustrated in the flow sheet constituting the accompanying drawing. Referring to the drawing, the precipitation of the ammonium chloride addition product is effected in Reactor I and the regeneration of the precipitant is effected in the Reactor II.

The drawing illustrates one method of operation of the invention. Mother liquor from the centrifuge containing $NH_3$ and small quantities of $Na_2CO_3$, $NaCl$ and $NH_4Cl$ is recycled to the saturator and saturated with solid $NaCl$. After saturation with $NaCl$ the solution from the saturator is then passed to the carbonator wherein it is carbonated by treatment with $CO_2$ for example. The carbonator may be a tower for continuous operation, or any suitable absorbing vessel. The carbonated ammoniacal sodium chloride brine resulting from the above treatment passes to Reactor I where it is treated with mercuric hydroxyl chloramide, the mixture being agitated until reaction is complete. The slurry resulting from the reaction in Reactor I is passed to the filter and the ammonium chloride addition product formed is removed by filtration, the filtrate passing to the percipitator where it is treated with $NH_3$ gas recovered from the still, for example, for the recovery of $Na_2CO_3.H_2O$. Precipitated $Na_2CO_3.H_2O$ is separated from the liquor in the centrifuge and the filtrate or liquor remaining from the centrifuging operation is returned to the saturator and the operation repeated.

The ammonium chloride addition product recovered in the filtering operation is treated with water at about 100° C. in Reactor II. Mercuric hydroxyl chloramide is regenerated by this treatment and is separated, at elevated temperature, from the resulting solution of ammonium chloride by filtration in a second filter, for example. The regenerated mercuric hydroxyl chloramide is returned to Reactor I and reused in the next cycle of operation. The ammonia content of the ammonium chloride solution is recovered by treatment with lime at elevated temperature in the conventional manner in the still. Calcium chloride formed by the above treatment with lime is removed and purified in any desired manner. The recovered $NH_3$ gas is with advantage returned to the precipitator for use in the cycle of operation.

It will be apparent that the further treatment of the aqueous solutions of sodium carbonates produced in accordance with the invention is not limited to the several specific operations more particularly described but that they may be further treated for the recovery of the sodium carbonates or sodium hydroxide, for example, in any chosen manner applicable to solutions of such constitution.

The invention is similarly useful in the production of the carbonates and hydroxides of the other alkali metals, in the production of potassium carbonate and potassium hydroxide from potassium chloride, for example.

I claim:

1. A method of separating ammonium chloride from aqueous solutions of an alkali-metal chloride, which comprises precipitating the ammonium chloride as an addition product with mercuric hydroxyl chloramide.

2. A method of separating ammonium chloride from aqueous solutions of sodium chloride as an addition product, which comprises precipitating the ammonium chloride with mercuric hydroxyl chloramide.

3. A method of producing aqueous solutions of alkali-metal carbonates, which comprises precipitating ammonium chloride as an addition product from an aqueous solution of an alkali-metal chloride with mercuric hydroxyl chloramide in the presence of ammonia and carbon dioxide.

4. A method of producing aqueous solutions of sodium carbonates, which comprises precipitating ammonium chloride as an addition product from an aqueous solution of sodium chloride with mercuric hydroxyl chloramide in the presence of ammonia and carbon dioxide.

5. A method of producing aqueous solutions of alkali-metal carbonates, which comprises precipitating ammonium chloride as an addition product from an aqueous solution of an alkali-metal chloride with mercuric hydroxyl chloramide in the presence of ammonia and carbon dioxide while maintaining the solution sufficiently dilute to prevent precipitation of alkali-metal carbonates.

6. A method of producing aqueous solutions of sodium carbonates, which comprises precipitating ammonium chloride as an addition product from an aqueous solution of sodium chloride with mercuric hydroxyl chloramide in the presence of ammonia and carbon dioxide while maintaining the solution sufficiently dilute to prevent precipitation of sodium carbonates.

7. A method of producing aqueous solutions of sodium bicarbonate, which comprises precipitating ammonium chloride as an addition product from an aqueous solution of sodium chloride with mercuric hydroxyl chloramide in the presence of ammonia and carbon dioxide while maintaining a molecular ratio $CO_2:NH_3$ of about 0.6–1.0 and while maintaining the solution sufficiently dilute to prevent precipitation of sodium bicarbonate.

8. A method of producing aqueous solutions of sodium sesquicarbonate which comprises precipitating ammonium chloride as an addition product from an aqueous solution of sodium chloride with mercuric hydroxyl chloramide in the presence of ammonia and carbon dioxide while maintaining a molecular ratio $CO_2:NH_3$ of about 0.4–0.6 and while maintaining the solution sufficiently dilute to prevent precipitation of sodium sesquicarbonate.

9. A method of producing aqueous solutions of sodium carbonate and sodium hydroxide, which comprises precipitating ammonium chloride as an addition product from an aqueous solution of sodium chloride with mercuric hydroxyl chloramide in the presence of ammonia and carbon dioxide while maintaining a molecular ratio $CO_2:NH_3$ of about 0.2–0.5 and while maintaining the solution sufficiently dilute to prevent precipitation of sodium carbonate.

10. A method of producing sodium bicarbonate, which comprises precipitating ammonium chloride as an addition product from an aqueous solution of sodium chloride with mercuric hydroxyl chloramide in the presence of ammonia and carbon dioxide while maintaining a molecular ratio $CO_2:NH_3$ of about 0.6–1.0 and while maintaining the solution sufficiently dilute to prevent precipitation of sodium bicarbonate, separating the precipitate and precipitating sodium bicarbonate from the solution by concentration.

11. A method of producing sodium sesquicarbonate, which comprises precipitating ammonium chloride as an addition product from an aqueous solution of sodium chloride with mercuric hydroxyl chloramide in the presence of ammonia and carbon dioxide while maintaining a molecular ratio $CO_2:NH_3$ of about 0.4–0.6 and while maintaining the solution sufficiently dilute to prevent precipitation of sodium sesquicarbonate, separating the precipitate and precipitating sodium sesquicarbonate from the solution by concentration.

12. A method of producing sodium carbonate monohydrate, which comprises precipitating ammonium chloride as an addition product from an aqueous solution of sodium chloride with mercuric hydroxyl chloramide in the presence of ammonia and carbon dioxide while maintaining a molecular ratio $CO_2:NH_3$ of about 0.2–0.5 and while maintaining the solution sufficiently dilute to prevent precipitation of sodium carbonate, separating the precipitate, and precipitating sodium carbonate monohydrate from the solution by the addition of ammonia in proportion less than that precipitating sodium carbamate.

13. A method of producing aqueous solutions of sodium hydroxide, which comprises precipitating ammonium chloride as an addition product from an aqueous solution of sodium chloride with mercuric hydroxyl chloramide in the presence of ammonia and carbon dioxide while maintaining a molecular ratio $CO_2:NH_3$ of about 0.2–1.0 and while maintaining the solution sufficiently dilute to prevent precipitation of sodium carbonates, separating the precipitate and causticizing the solution.

14. A method of separating ammonium chloride from aqueous solutions of an alkali-metal chloride, which comprises precipitating the ammonium chloride as an addition product with mercuric hydroxyl chloramide and separating the precipitate from the solution, decomposing the separated precipitate with water at elevated temperature to form a solution of ammonium chloride and a precipitate of mercuric hydroxyl chloramide, and separating the precipitate from the solution.

15. A method of separating ammonium chloride from aqueous solutions of an alkali-metal chloride, which comprises precipitating the ammonium chloride as an addition product with mercuric hydroxyl chloramide and separating the precipitate from the solution, decomposing the separated precipitate with water at elevated temperature to form a solution of ammonium chloride and a precipitate of mercuric hydroxyl chloramide, separating the precipitate from the solution, and precipitating ammonium chloride as an addition product from an aqueous solution of an alkali-metal chloride with the separated mercuric hydroxyl chloramide in a repetition of the operation.

16. In the regeneration of mercuric hydroxyl chloramide from the ammonium chloride addition product formed by the action of ammonium chloride and mercuric hydroxyl chloramide, the improvement which comprises treating the addition product with a base displacing ammonia and recovering the mercuric hydroxyl chloramide formed thereby.

ROBERT B. MacMULLIN.